United States Patent
Jeong et al.

(10) Patent No.: US 9,865,075 B2
(45) Date of Patent: Jan. 9, 2018

(54) GRAPHICS PROCESSING APPARATUS AND GRAPHICS PROCESSING METHOD

(71) Applicant: SAMSUNG ELECTRONICS CO., LTD., Suwon-si (KR)

(72) Inventors: Seong-hun Jeong, Hwaseong-si (KR); Bong-hoon Park, Cheongju-si (KR); Woo-ram Ann, Yongin-si (KR); Jin-bong Lee, Changwon-si (KR); Sung-kyu Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/449,575

(22) Filed: Aug. 1, 2014

(65) Prior Publication Data

US 2015/0042644 A1    Feb. 12, 2015

(30) Foreign Application Priority Data

Aug. 12, 2013  (KR) .................. 10-2013-0095522

(51) Int. Cl.
*G06T 15/00* (2011.01)
*G09G 5/377* (2006.01)
(Continued)

(52) U.S. Cl.
CPC .......... *G06T 15/005* (2013.01); *G06T 15/503* (2013.01); *G09G 5/377* (2013.01);
(Continued)

(58) Field of Classification Search
CPC ..... G06T 1/20; G06T 15/005; G06T 2210/52; G06T 1/00; G06T 2200/28; G09G 5/363; G09G 2360/06; G09G 5/12; G06F 9/3885
See application file for complete search history.

(56) References Cited

U.S. PATENT DOCUMENTS 6,885,374 B2   4/2005  Doyle et al.
7,737,981 B2   6/2010  Takezaki
(Continued)

FOREIGN PATENT DOCUMENTS

JP   2008-123519 A   5/2008
JP   2009-151658 A   7/2009
(Continued)

OTHER PUBLICATIONS

Cavin, et al., "COTS Cluster-based Sort-last Rendering: Performance Evaluation and Pipelined Implementation", 2005, 9 pages, URL: https://web.archive.org/web/20130623042357/http://citeseerx.ist.psu.edu/viewdoc/summary?doi=10.1.1.220.3791.

(Continued)

*Primary Examiner* — Jeffrey Chow (74) *Attorney, Agent, or Firm* — Sughrue Mion, PLLC (57) ABSTRACT

A graphics processing apparatus and a graphics processing method are provided. The graphics processing method processes applications using a plurality of GPUs includes rendering a plurality of video data constituting at least one application using the plurality of GPUs, blending the plurality of video data that are rendered by the plurality of GPUs, and outputting blended images, wherein the blending performs blending through at least one of the GPUs that does not perform a rendering job and a video processing constituent element which is different from the plurality of GPUs.

16 Claims, 9 Drawing Sheets

(51) Int. Cl.
 *G06T 15/50* (2011.01)
 *G09G 3/00* (2006.01)
(52) U.S. Cl.
 CPC .......... *G06T 2210/52* (2013.01); *G09G 3/003* (2013.01); *G09G 2340/10* (2013.01); *G09G 2360/06* (2013.01); *G09G 2360/08* (2013.01)

(56) References Cited

U.S. PATENT DOCUMENTS

| | | | |
|---|---|---|---|
| 8,149,242 | B2 | 4/2012 | Langyel et al. |
| 8,149,247 | B1* | 4/2012 | Diard ................. G06F 3/14 345/502 |
| 8,305,398 | B2 | 11/2012 | Finger et al. |
| 8,941,669 | B1* | 1/2015 | Moreton ............. G06F 15/16 345/502 |
| 2002/0015055 | A1 | 2/2002 | Foran |
| 2003/0164832 | A1 | 9/2003 | Alcorn |
| 2009/0027383 | A1* | 1/2009 | Bakalash ............ G06F 9/5044 345/419 |
| 2009/0079747 | A1* | 3/2009 | Johnson ............. G06T 15/503 345/506 |
| 2011/0279462 | A1 | 11/2011 | Bakalash et al. |
| 2012/0188270 | A1 | 7/2012 | Diard |

FOREIGN PATENT DOCUMENTS

| | | |
|---|---|---|
| KR | 10-2004-0015757 A | 2/2004 |
| KR | 10-2008-0024167 A | 3/2008 |
| KR | 10-0978814 B1 | 8/2010 |

OTHER PUBLICATIONS

Communication, Issued by the International Searching Authority, dated Oct. 8, 2014, In counterpart International Application No. PCT/KR2014/005642.

Written Opinion, Issued by the International Searching Authority, dated Oct. 8, 2014, In counterpart International Application No. PCT/KR2014/005642.

* cited by examiner

GRAPHICS PROCESSING APPARATUS AND GRAPHICS PROCESSING METHOD

PRIORITY

This application claims priority from Korean Patent Application No. 10-2013-0095522, filed on Aug. 12, 2013, in the Korean Intellectual Property Office, the disclosure of which is incorporated herein by reference.

BACKGROUND

1. Field

Methods and apparatuses consistent with the exemplary embodiments relate to a graphics processing apparatus and a graphics processing method, and more particularly to a graphics processing apparatus and a graphics processing method, which processes images using a plurality of Graphics Processing Units (GPUs).

2. Description of the Related Art

A graphics processing apparatus in the related art performs rendering and blending with respect to a plurality of applications using a plurality of GPUs. Specifically, the graphics processing apparatus in the related art performs rendering of a first application among a plurality of applications using a first GPU among a plurality of GPUs, and performs rendering of a second application among the plurality of applications using a second GPU among the plurality of GPUs. Accordingly, the graphics processing apparatus in the related art can quickly perform rendering jobs with respect to the plurality of applications.

However, the graphics processing apparatus in the related art performs blending of video data that is related to applications rendered by respective GPUs through any one GPU among the plurality of GPUs. As described above, since the graphics processing apparatus in the related art performs blending of the video data related to the applications rendered by the respective GPUs through a specific GPU, a load may occur when the corresponding GPU performs the video processing jobs.

Further, the graphics processing apparatus in the related art has the problem that while a specific GPU among the plurality of GPUs blends the video data related to the rendered applications, the remaining GPUs are kept in an idle state, and thus the plurality of GPUs are unable to be efficiently used.

SUMMARY

Accordingly, an aspect of the exemplary embodiments is to improve a video processing speed through an efficient use of a plurality of GPUs in a graphics processing apparatus.

According to an aspect of the exemplary embodiment, a graphics processing method for processing applications using a plurality of GPUs, includes rendering a plurality of video data constituting at least one application using the plurality of GPUs; blending the plurality of video data that are rendered by the plurality of GPUs; and outputting blended images, wherein the blending is performed by at least one of the GPUs that does not perform a rendering job, and by a video processing constituent element which is different from the plurality of GPUs.

According to another aspect of the exemplary embodiment, the video processing constituent element may be implemented by at least one of a two-dimensional (2D) accelerator and a video controller.

According to another aspect of the exemplary embodiment, the graphics processing method may further include scheduling the rendering job of the plurality of video data constituting the at least one application with respect to the plurality of GPUs, wherein the rendering renders the plurality of video data using the plurality of GPUs according to the scheduling.

According to another aspect of the exemplary embodiment, the scheduling may additionally schedule the rendering job of the plurality of video data with respect to at least one GPU that is in an idle state among the plurality of GPUs based on a state of the rendering job that is pre-performed in the plurality of GPUs.

According to another aspect of the exemplary embodiment, the rendering may render first video data among the plurality of video data through a first GPU among the plurality of GPUs in accordance with the scheduling of the rendering job of the plurality of video data constituting the single application, and may render second video data among the plurality of video data through a second GPU among the plurality of GPUs.

According to another aspect of the exemplary embodiment, the rendering may render first and second video data constituting a first application through first and second GPUs among the plurality of GPUs in accordance with the rendering job scheduling of the plurality of applications, and may render first and second video data constituting a second application through third and fourth GPUs among the plurality of GPUs.

According to another aspect of the exemplary embodiment, the rendering may perform an operation of first and second video data constituting the single application through first and second GPUs among the plurality of GPUs in accordance with the rendering job scheduling of the plurality of video data constituting the single application, and may render the first and second video data based on the operation result through third and fourth GPUs among the plurality of GPUs.

According to another aspect of the exemplary embodiment, the rendering may perform an operation of the respective video data constituting first and second applications through first and second GPUs among the plurality of GPUs in accordance with the rendering job scheduling of the plurality of applications, and may render the respective video data constituting the first and second applications based on the operation result through third and fourth GPUs among the plurality of GPUs.

According to another aspect of the exemplary embodiment, a graphics processing apparatus includes a display; a plurality of GPUs configured to render a plurality of video data constituting at least one application based on the plurality of GPUs; and a controller configured to blend the plurality of video data that are rendered by the plurality of GPUs and to display the blended video data through the display, wherein the controller operates to perform blending through at least one of the GPUs that does not perform a rendering job, and through a video processing constituent elements which is different from the plurality of GPUs.

According to another aspect of the exemplary embodiment, the video processing constituent element may be implemented by at least one of a 2D accelerator and a video controller.

According to another aspect of the exemplary embodiment, the graphics processing apparatus may further include a storage, wherein the controller schedules the rendering job of the plurality of video data constituting the at least one application with respect to the plurality of GPUs to store the scheduling, and the plurality of GPUs render the plurality of video data according to the scheduling pre-stored in the storage.

According to another aspect of the exemplary embodiment, the controller may additionally schedule the rendering job of the plurality of video data with respect to at least one GPU that is in an idle state among the plurality of GPUs based on a state of the rendering job that is pre-performed in the plurality of GPUs.

According to another aspect of the exemplary embodiment, the plurality of GPUs may include a first GPU configured to render first video data among the plurality of video data in accordance with the scheduling of the rendering job of the plurality of video data constituting the single application; and a second GPU configured to render second video data among the plurality of video data.

According to another aspect of the exemplary embodiment, the plurality of GPUs may include a first GPU configured to render first video data constituting a first application according to the scheduling of the rendering job of the plurality of applications; a second GPU configured to render second video data constituting the first application; a third GPU configured to render the first video data constituting a second application; and a fourth GPU configured to render the second video data constituting the second application.

According to another aspect of the exemplary embodiment, the plurality of GPUs may include a first GPU configured to perform an operation of first video data among the plurality of video data according to the scheduling of the rendering job of the plurality of video data constituting the single application; a second GPU configured to perform an operation of second video data; a third GPU configured to render the first video data based on the operation of the first GPU; and a fourth GPU configured to render the second video data based on the operation result of the second GPU.

According to another aspect of the exemplary embodiment, the plurality of GPUs may include a first GPU configured to perform an operation of respective video data constituting a first application according to the scheduling of the rendering job of the plurality of applications; a second GPU configured to perform an operation of respective video data constituting a second application; a third GPU configured to render the respective video data constituting the first application based on the operation result of the first GPU; and a fourth GPU configured to render the respective video data constituting the second application based on the operation result of the second GPU.

As described above, according to various exemplary embodiments of the present disclosure, the graphics processing apparatus can improve the video processing speed through an efficient use of the plurality of GPUs.

BRIEF DESCRIPTION OF THE DRAWINGS

The above and other aspects will be more apparent from the following detailed description when taken in conjunction with the accompanying drawings, in which.

DETAILED DESCRIPTION OF EXEMPLARY EMBODIMENTS

Hereinafter, exemplary embodiments will be described in detail with reference to the accompanying drawings.

Figure 1:
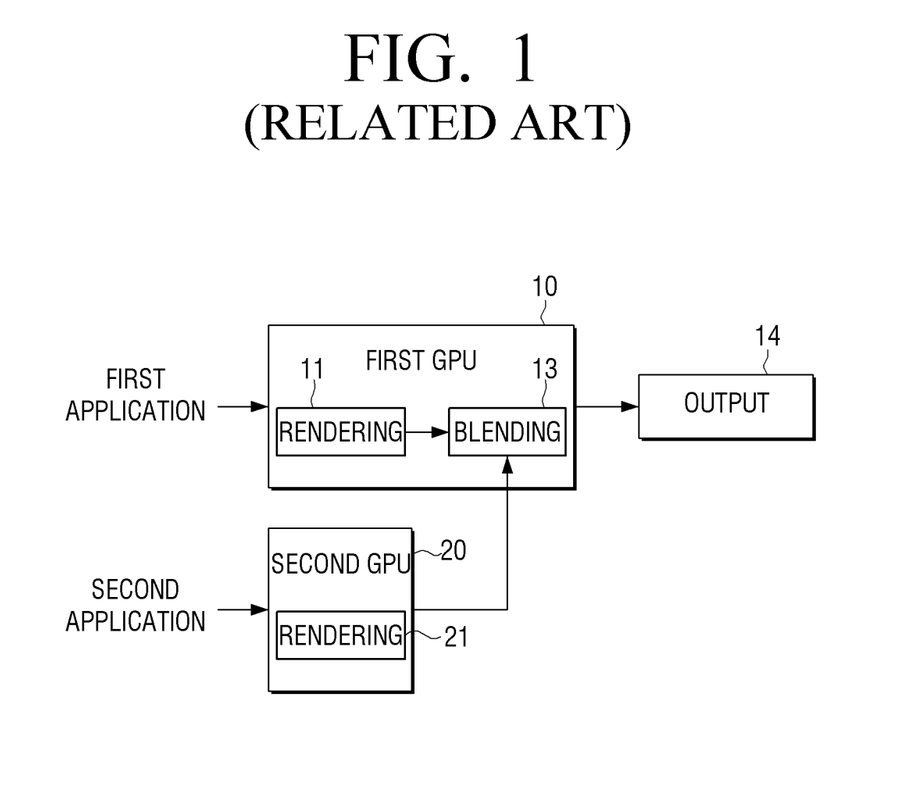
FIG. 1 is an exemplary diagram explaining video processing of applications through a plurality of GPUs in a general graphics processing apparatus.

FIG. 1 is an exemplary diagram explaining video processing of applications through a plurality of GPUs in a related art graphics processing apparatus.

As illustrated in FIG. 1, a general graphics processing apparatus performs video processing of a plurality of applications through a plurality of Graphics Processing Units (GPUs). As illustrated, a plurality of video data constituting first and second applications may be respectively input to first and second GPUs 10 and 20.

As described above, if the plurality of video data constituting the first and second applications are input to the first and second GPUs 10 and 20, the first and second GPUs 10 and 20 perform rendering 11 and 21 of the video data constituting the first and second applications, respectively. That is, the first GPU 10 performs rendering 11 of the video data constituting the first application, and the second GPU 20 performs rendering 21 of the video data constituting the second application.

On the other hand, the second GPU 20 performs rendering of the video data constituting the second application, and then transmits the rendered video data to the first GPU 10. Accordingly, the first GPU 10 performs blending 13 of the rendered video data of the plurality of video data constituting the first application and the video data of the second application that is rendered by the second GPU 20. Thereafter, the first GPU 10 outputs, through an output 14, video images in which respective video data of the first and second applications are blended.

As described above, since the graphics processing apparatus in the related art performs the rendering of the plurality of applications through the first and second GPUs 10 and 20, rendering jobs of the plurality of applications can be rapidly performed. However, since the video data that are rendered through the first and second GPUs 10 and 20 are blended through the first GPU 10, the second GPU 20 does not perform any video processing while the first GPU 10 performs the blending. Accordingly, the graphics processing apparatus in the related art has the problem that the plurality of GPUs are not efficiently used.

Figure 2:
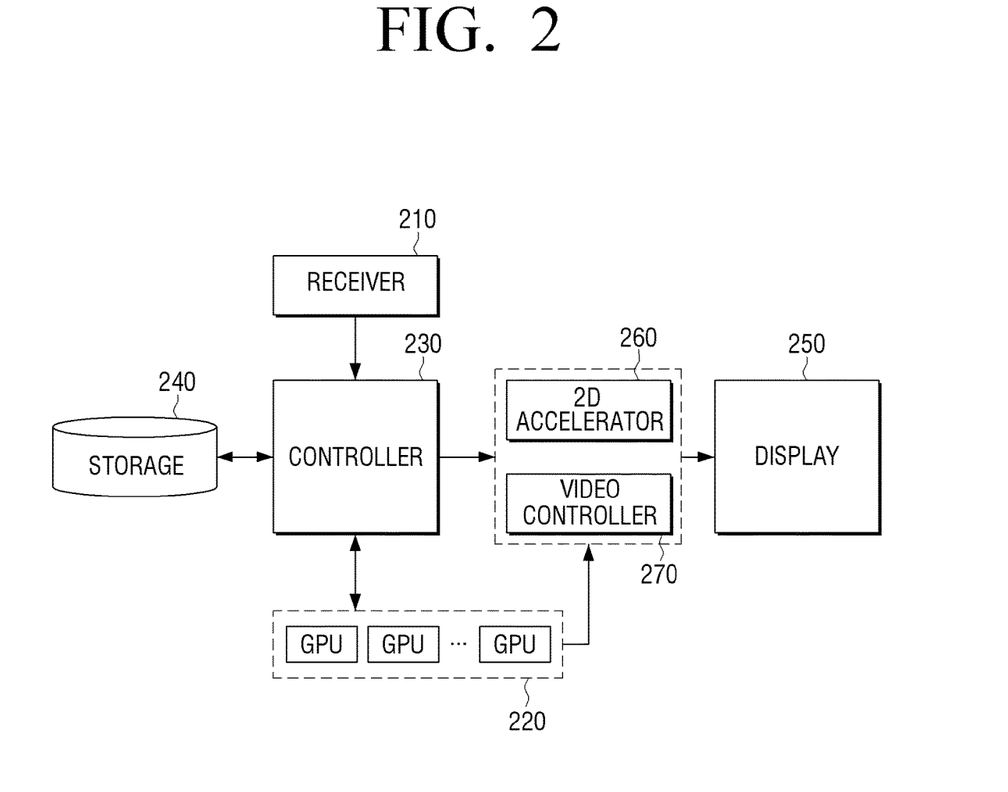
FIG. 2 is a block diagram of a graphics processing apparatus according to an exemplary embodiment.

FIG. 2 is a block diagram of a graphics processing apparatus according to an exemplary embodiment.

As illustrated in FIG. 2, the graphics processing apparatus includes a receiver 210, a plurality of GPUs 220, a controller 230, a storage 240, and a display 250. The graphics processing apparatus may be applied to a smart phone, a tablet personal computer (PC), or a smart television (TV).

The receiver 210 receives a plurality of video data constituting at least one application. Then, the plurality of GPUs 220 perform rendering of the plurality of video data constituting the at least one application. Here, the plurality of GPUs 220 are three-dimensional (3D) video graphics dedicated processors.

The controller 230 controls the overall operation of respective constituent elements of the graphics processing apparatus. In particular, the controller 230 blends the plurality of video data that are rendered by the plurality of GPUs 220, and controls the display 250 to display blended images. Specifically, the controller 230 operates to perform blending through at least one of the GPUs that does not perform a rendering job among the plurality of GPUs 220, and through a video processing constituent element which is different from the plurality of GPUs 220. Here, the video processing constituent element may be implemented by at least one of a two-dimensional (2D) accelerator 260 that performs video processing of 2D graphics images, and a video controller 270 that outputs blended images through the display 250. Accordingly, the 2D accelerator 260 or the video controller 270 can blend the video data that are rendered by at least two of the plurality of GPUs 220.

On the other hand, the controller 230 according to the exemplary embodiment blends the rendered video data through at least one of the GPUs that does not perform the rendering job among the plurality of GPUs 220, the 2D accelerator 260, and the video controller 270. However, the exemplary embodiment is not limited thereto, and the controller 230 may blend the rendered video data using another Digital Signal Processing (DSP) constituent element in the graphics processing apparatus.

On the other hand, the controller 230 according to the exemplary embodiment schedules the rendering job of the plurality of video data constituting the at least one application with respect to the plurality of GPUs 220, and stores the scheduling in the storage 240. Accordingly, the plurality of GPUs 220 can render the plurality of video data constituting the at least one application according to the scheduling pre-stored in the storage 240, and temporarily store the rendered video data in the storage 240.

Further, the controller 230 may additionally schedule the rendering job of the plurality of video data with respect to at least one GPU that is in an idle state among the plurality of GPUs 220 based on the state of the rendering job that is pre-performed according to predetermined scheduling in the plurality of GPUs 220. Accordingly, at least one GPU that is in an idle state among the plurality of GPUs 220 can perform the rendering job of the plurality of video data according to the additionally set scheduling.

Figure 3:
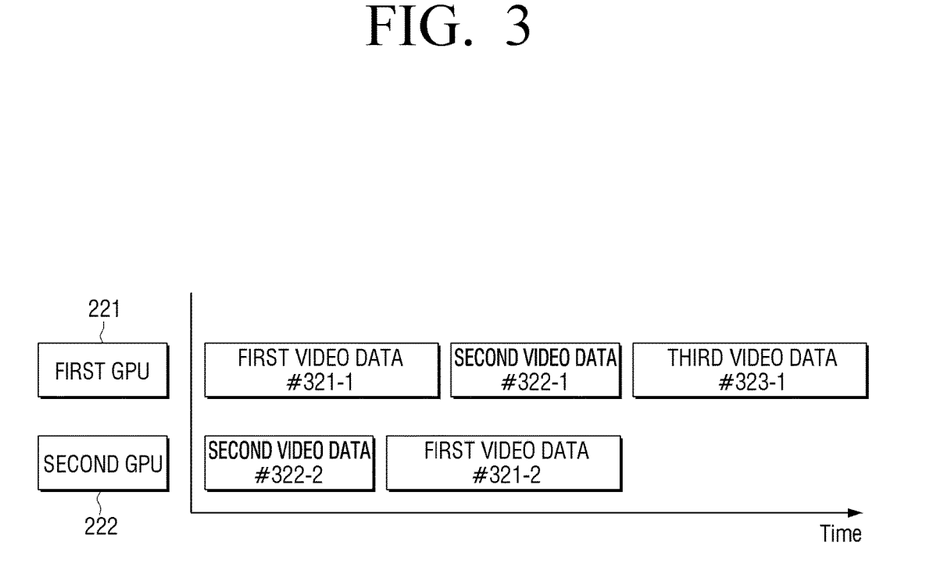
FIG. 3 is an exemplary diagram explaining a rendering job of a plurality of video data that is performed according to scheduling in a plurality of GPUs according to an exemplary embodiment.

FIG. 3 is an exemplary diagram explaining a rendering job of a plurality of video data that is performed according to scheduling in a plurality of GPUs according to an exemplary embodiment.

As illustrated in FIG. 3, first and second GPUs 221 and 222 can sequentially perform video processing related to the rendering of the plurality of video data constituting the application according to the predetermined scheduling.

Here, the length of each block indicates the degree of time that is required to perform the video processing job related to the rendering of the respective video data. That is, among the plurality of video data constituting the application, first video data requires the most time to perform the video processing related to the rendering, and second video data requires the least time to perform the video processing related to the rendering. With respect to the plurality of video data constituting the application as described above, the first and second GPUs 221 and 222 can perform the video processing job related to the rendering according to the predetermined scheduling.

Specifically, the first GPU 221 performs rendering #322-1 of the second video data after performing an operation #321-1 of the first video data among the plurality of video data constituting the application according to the predetermined scheduling. If rendering #322-1 of the second video data is completed, rendering #323-1 of the third video data is performed.

On the other hand, the second GPU 222 performs an operation #322-2 of the second video data at a time when the first GPU 221 performs the operation #321-1 of the first video data. If the operation #322-2 of the second video data is completed, the second GPU 222 performs rendering #321-2 of the first data based on the operation result that is temporarily stored in the storage 240 as the first GPU 221 performs the operation #321-1 of the first video data 321.

On the other hand, as described above, the first GPU 221, which performs the rendering #322-1 of the second video data, can perform the rendering #322-1 of the second video data based on the operation result that is temporarily stored in the storage 240 as the second GPU 222 performs the operation #322-2 of the second video data.

As described above, the first and second GPUs 221 and 222 can perform the video processing job related to the rendering of the plurality of video data constituting the application according to the predetermined scheduling.

On the other hand, as illustrated, at a time when the first GPU 221 performs the rendering #323-1 of the third video data, the second GPU 222 may be in an idle state. In this case, the controller 230 may additionally set scheduling related to the rendering of another video data constituting the corresponding application or one of the plurality of video data constituting the other application with respect to the second GPU 222 that is in an idle state.

Accordingly, after performing the rendering #321-2 of the first video data, the second GPU 222 can additionally perform the video processing job related to the rendering of another video data according to the set scheduling.

Hereinafter, the operation of processing an application image that is performed by the graphics processing apparatus according to the present disclosure according to various exemplary embodiments will be described in detail.

Figure 4:
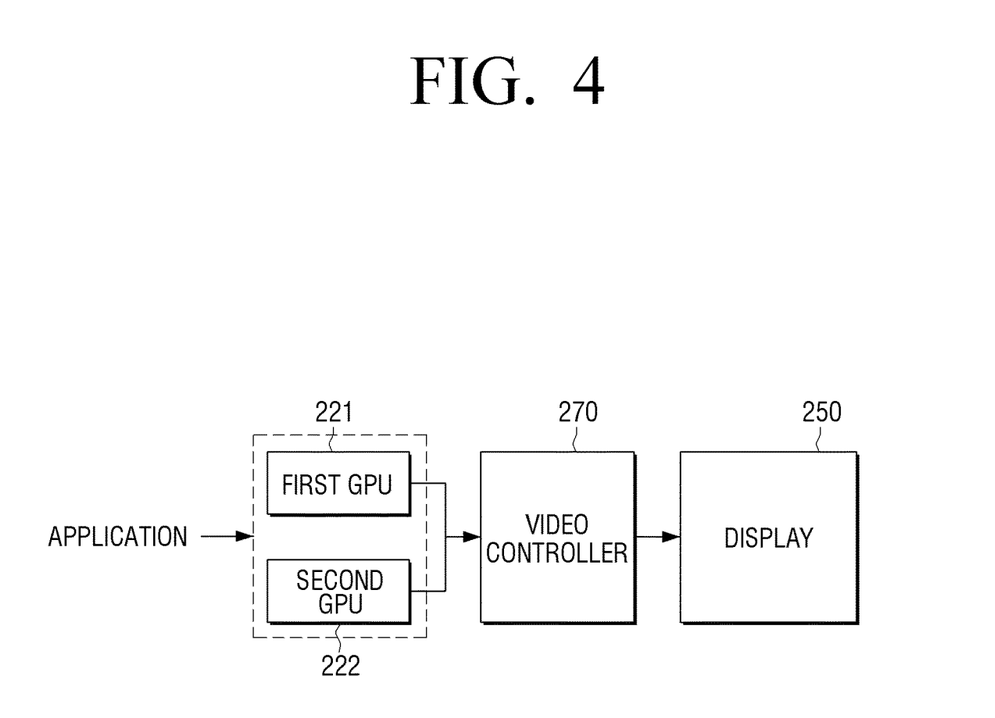
FIG. 4 is a first exemplary diagram explaining video processing of a single application that is performed in a graphics processing apparatus according to an exemplary embodiment.
Figure 5:
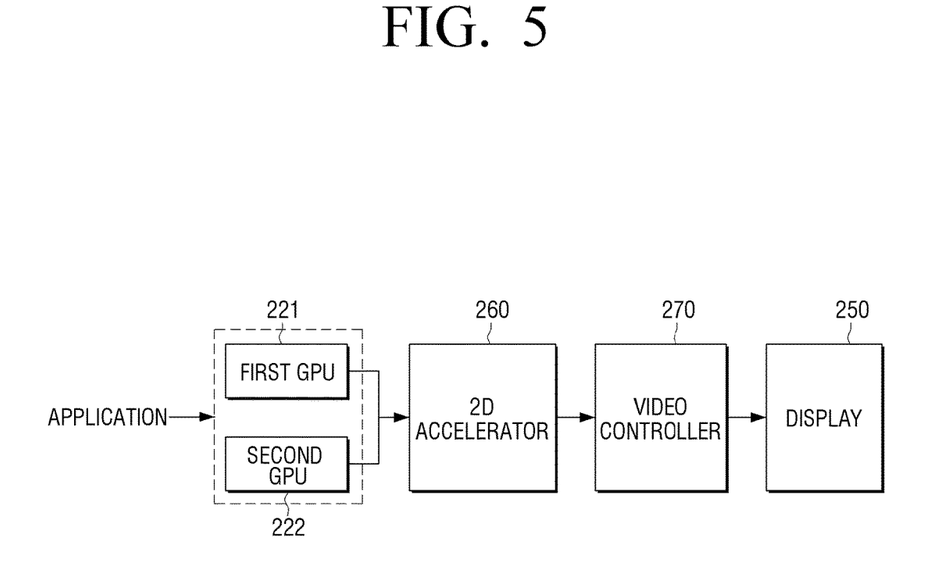
FIG. 5 is a second exemplary diagram explaining video processing of a single application that is performed in a graphics processing apparatus according to another exemplary embodiment.

FIG. 4 is a first exemplary diagram explaining video processing of a single application that is performed in a graphics processing apparatus according to an exemplary embodiment, and FIG. 5 is a second exemplary diagram explaining video processing of a single application that is performed in a graphics processing apparatus according to another exemplary embodiment.

As illustrated in FIG. 4, according to the rendering job scheduling of the plurality of video data constituting a single application, a first GPU 221 performs rendering of the first video data among the plurality of video data constituting the single application. Further, a second GPU 222 performs rendering of the second video data among the plurality of video data constituting the single application. As described above, if the rendering of the first and second video data constituting the single application is performed through the first and second GPUs 221 and 222, a video controller 270 performs blending of the first and second video data that are rendered through the first and second GPUs 221 and 222 and outputs the first and second blended video data to a display 250.

On the other hand, as illustrated in FIG. 5, if the graphics processing apparatus is provided with a 2D accelerator 260, the 2D accelerator 260 can perform the blending of the first and second video data that are rendered through the first and second GPUs 221 and 222. As described above, if the blending of the first and second video data constituting the single application is performed through the 2D accelerator 260, the video controller 270 can output blended images to the display 250.

On the other hand, the exemplary embodiment is not limited thereto, and as described above, the graphics processing apparatus can perform the blending of the first and second video data that are rendered through the first and second GPUs 221 and 222 using the remaining GPUs except for the first and second GPUs 221 and 222 that perform the rendering of the first and second video data constituting the single application.

Figure 6:
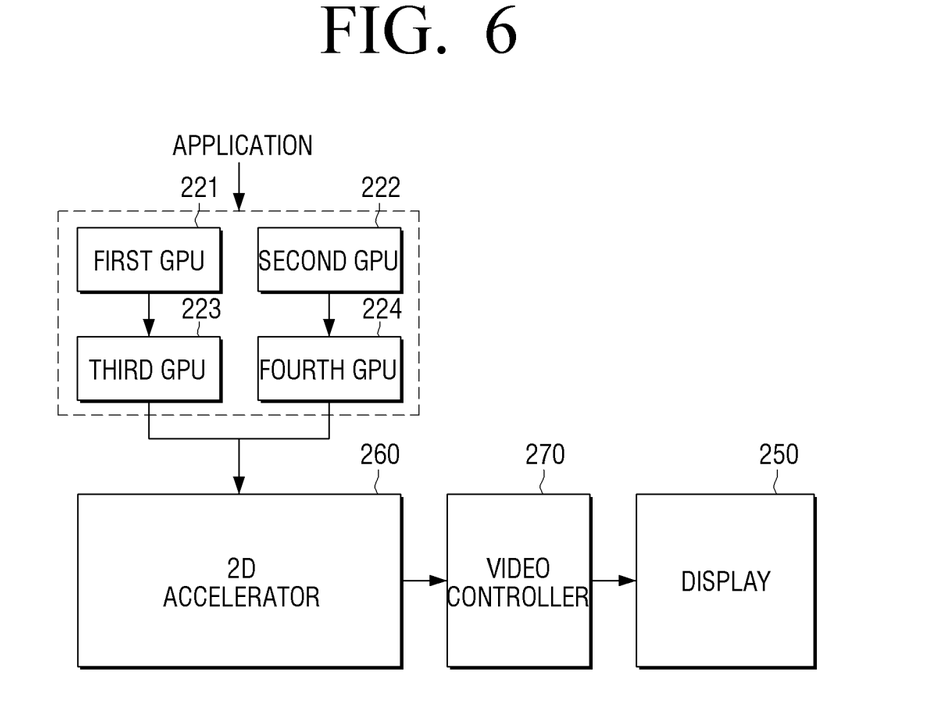
FIG. 6 is a third exemplary diagram explaining video processing of a single application that is performed in a graphics processing apparatus according to another exemplary embodiment.

FIG. 6 is a third exemplary diagram illustrating video processing of a single application that is performed in a graphics processing apparatus according to another exemplary embodiment.

As illustrated in FIG. 6, according to the rendering job scheduling of the plurality of video data constituting a single application, a first GPU 221 performs an operation on first video data among the plurality of video data, and a second GPU 222 performs an operation on second video data among the plurality of video data.

Thereafter, a third GPU 223 performs rendering of the first video data based on the operation result of the first video data that is operated by the first GPU 221. Then, a fourth GPU 224 performs rendering of the second video data based on the operation result of the second video data that is operated by the second GPU 222.

If the rendering of the first and second video data constituting the single application is performed through the third and fourth GPUs 223 and 224, a 2D accelerator 260 performs blending of the first and second video data that are rendered through the third and fourth GPUs 223 and 224 and outputs the third and fourth blended video data to a video controller 270. Accordingly, the video controller 270 outputs the video data that is blended through the 2D accelerator 260 to a display 250, and thus the display 250 displays blended application images.

Hereinafter, the operation of video-processing a plurality of applications through a plurality of GPUs 220 will be described in detail.

Figure 7:
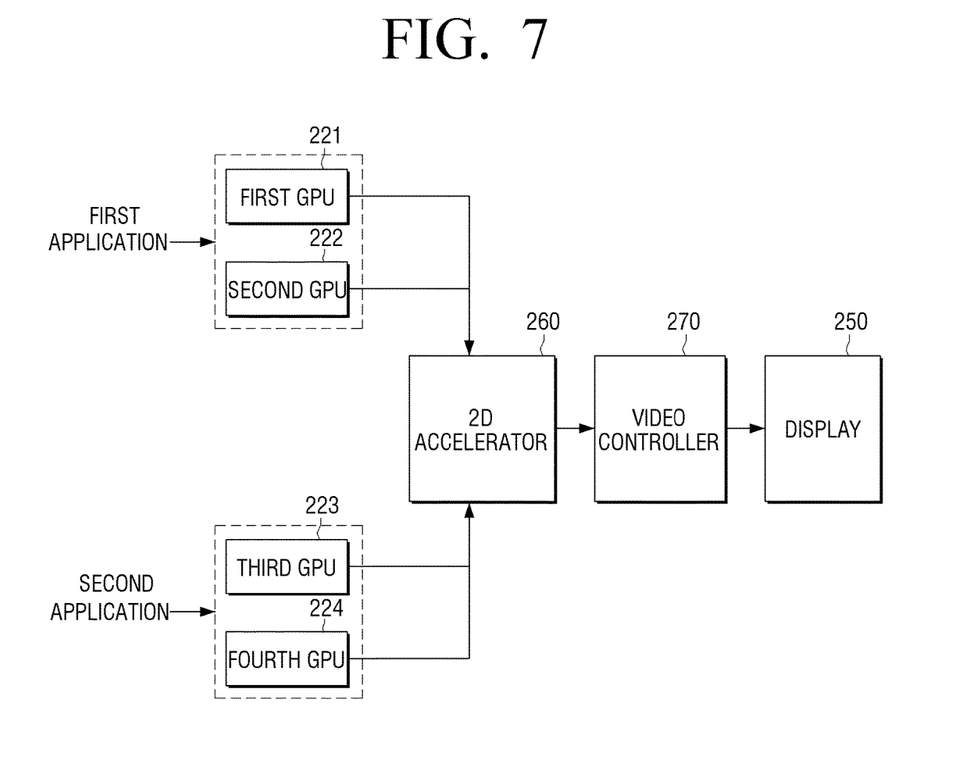
FIG. 7 is a first exemplary diagram explaining video processing of a plurality of applications that is performed in a graphics processing apparatus according to an exemplary embodiment.

FIG. 7 is a first exemplary diagram explaining video processing of a plurality of applications that is performed in a graphics processing apparatus according to an exemplary embodiment exemplary embodiment.

As illustrated in FIG. 7, according to the rendering job scheduling of a plurality of applications, a first GPU 221 performs rendering of first video data constituting the first application among the plurality of applications, and a second GPU 222 performs rendering of second video data constituting the first application.

Further, a third GPU 223 performs rendering of the first video data constituting the second application among the plurality of applications, and a fourth GPU 224 performs rendering of the second video data constituting the second application.

As described above, if the rendering of the respective video data constituting the first and second applications is performed through the first to fourth GPUs 221 to 224, the first to fourth GPUs 221 to 224 output the respective rendered video data to a 2D accelerator 260. Accordingly, the 2D accelerator 260 performs blending of the respective video data constituting the first and second applications that are rendered through the first to fourth GPUs 221 to 224. That is, the 2D accelerator 260 blends the first and second video data constituting the first application that is rendered through the first and second GPUs 221 and 222, and the first and second video data constituting the second application that is rendered through the third and fourth GPUs 223 and 224, and outputs the respective blended video data to a video controller 270.

Accordingly, the video controller 270 outputs the video data that is blended through the 2D accelerator 260 to a display 250, and the display 250 displays a plurality of blended application images.

Figure 8:
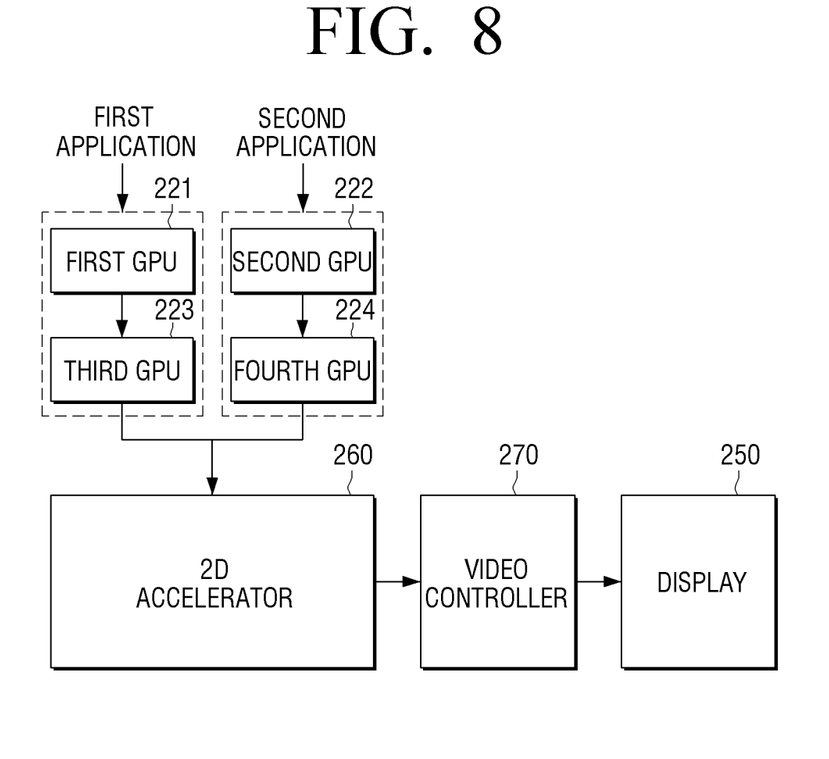
FIG. 8 is a second exemplary diagram explaining video processing of a plurality of applications that is performed in a graphics processing apparatus according to another exemplary embodiment.

FIG. 8 is a second exemplary diagram explaining video processing of a plurality of applications that is performed in a graphics processing apparatus according to another exemplary embodiment.

As illustrated in FIG. 8, according to the rendering job scheduling of a plurality of applications, a first GPU 221 performs an operation on respective video data constituting the first application among the plurality of applications, and a second GPU 222 performs an operation on respective video data constituting the second application among the plurality of applications.

If the operation of the respective video data constituting the first and second applications is performed through the respective first and second GPUs 221 and 222, respective third and fourth GPUs 223 and 224 perform rendering of the respective video data constituting the first and second applications based on the operation result on the respective video data constituting the first and second applications. Specifically, the third GPU 223 performs rendering of the respective video data constituting the first application based on the result of the operation performed on the respective video data constituting the first application that is operated through the first GPU 221. Further, the fourth GPU 224 performs rendering of the respective video data constituting the second application based on the result of the operation performed on the respective video data constituting the second application that is operated through the second GPU 222.

As described above, if the rendering of the respective video data constituting the first and second applications is performed through the third and fourth GPUs 223 and 224, the third and fourth GPUs 223 and 224 output the respective rendered video data to a 2D accelerator 260. Accordingly, the 2D accelerator 260 performs blending of the respective video data constituting the first and second applications that are rendered through the third and fourth GPUs 223 and 224. That is, the 2D accelerator 260 blends the video data constituting the first application that is rendered through the third GPU 223 and the video data constituting the second application that is rendered through the fourth GPU 224, and outputs the respective blended video data to a video controller 270.

Accordingly, the video controller 270 outputs the video data that is blended through the 2D accelerator 260 to a display 250, and the display 250 displays a plurality of blended application images.

Up to now, the operation of performing video processing of at least one application using a plurality of GPUs 220 in the graphics processing apparatus according to the present disclosure has been described in detail. Hereinafter, a method for performing video processing of at least one application based on a plurality of the GPUs 220 in the graphics processing apparatus according to an exemplary embodiment will be described in detail.

Figure 9:
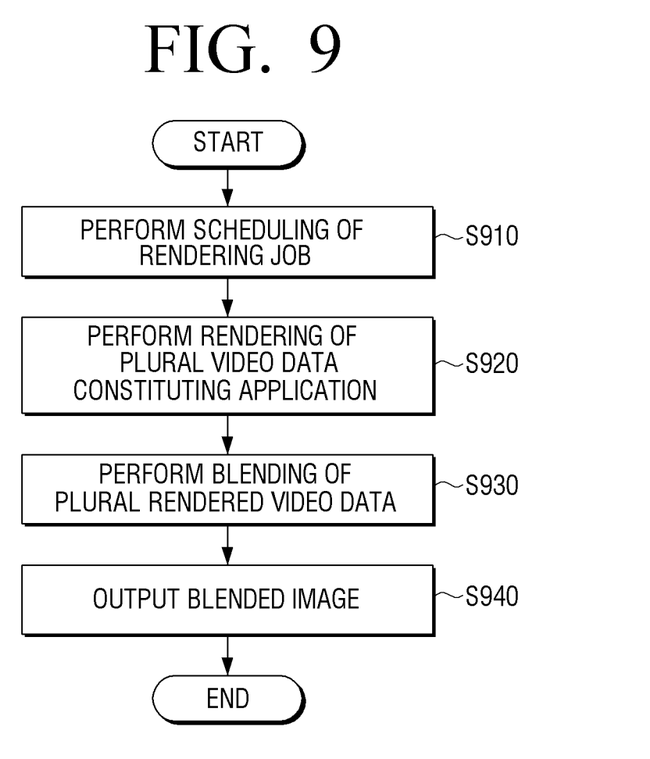
FIG. 9 is a flowchart of a graphics processing method for performing video processing of at least one application in a graphics processing apparatus according to an exemplary embodiment.

FIG. 9 is a flowchart of a graphics processing method for performing video processing of at least one application in a graphics processing apparatus according to an exemplary embodiment.

As illustrated in FIG. 9, if a plurality of video data constituting at least one application is input, the graphics processing apparatus schedules a rendering job of the corresponding video data with respect to a plurality of GPUs (operation S910). Thereafter, the graphics processing apparatus renders the plurality of video data constituting the at least one application using the plurality of GPUs according to a predetermined scheduling (operation S920). Then, the graphics processing apparatus blends the plurality of video data that are rendered through the plurality of GPUs, and outputs blended images (operations 5930 and S940).

Specifically, if the rendering of the plurality of video data is performed through the plurality of GPUs, the graphics processing apparatus may perform blending through at least one of the GPUs that does not perform a rendering job among the plurality of GPUs, and through video processing constituent elements which are different from the plurality of GPUs. Here, the video processing constituent element may be at least one of a 2D accelerator that performs video processing of 2D graphics images and a video controller 270 that outputs blended images. Accordingly, the 2D accelerator 260 or the video controller 270 can blend the video data that are rendered by at least two of the plurality of GPUs.

On the other hand, the graphics processing apparatus determines whether there is any GPU that is in an idle state among the plurality of GPUs based on the state of the rendering job that is pre-performed on the basis of the predetermined scheduling in the plurality of GPUs in operation S920. If it is determined that at least one GPU is in an idle state among the plurality of GPUs as the result of the determination, the graphics processing apparatus may additionally schedule the rendering job of the plurality of video data constituting the corresponding application with respect to the GPU that is in an idle state through operation S910. Accordingly, the GPU that is in an idle state can perform the rendering job of the plurality of video data according to the additionally set scheduling.

On the other hand, the graphics processing apparatus, which renders the plurality of video data using the plurality of GPUs according to the predetermined scheduling, can perform the rendering of the corresponding video data through the following exemplary embodiments.

First, the rendering job scheduling of the plurality of video data constituting a single application may be set with respect to the plurality of GPUs. In this case, according to an exemplary embodiment, the graphics processing apparatus may perform rendering of the first video data among the plurality of video data constituting a single application through the first GPU among the plurality of GPUs, and may perform rendering of the second video data among the plurality of video data through the second GPU.

According to another exemplary embodiment, the graphics processing apparatus performs an operation on the first and second video data constituting the single application through the first and second GPUs among the plurality of GPUs. If the operation on the first and second video data is performed, the graphics processing apparatus performs rendering of the first video data based on the result of the operation on the first video data, which is operated on by the first GPU, through the third GPU among the plurality of GPUs. Further, the graphics processing apparatus may perform rendering of the second video data based on the result of the operation on the second video data, which is operated on by the second GPU, through the fourth GPU.

As described above, if the rendering of the first and second video data constituting the single application is performed, the graphics processing apparatus, as described above, can perform blending of the rendered first and second video data through a 2D accelerator, and display blended application images.

On the other hand, the rendering job scheduling of a plurality of applications may be set with respect to a plurality of GPUs. In this case, according to an exemplary embodiment, the graphics processing apparatus performs rendering of the respective first and second video data constituting the first application among the plurality of applications through the respective first and second GPUs among the plurality of GPUs. Further, the graphics processing apparatus performs rendering of the first and second video data constituting the second application among the plurality of applications through the third and fourth GPUs.

As described above, if the rendering of the respective video data constituting the first and second applications is performed through first to fourth GPUs, the graphics processing apparatus may perform the blending of the respective video data constituting the first and second applications that are pre-rendered through the 2D accelerator and display a plurality of blended application images on a display.

According to another exemplary embodiment, the graphics processing apparatus performs an operation on the video data constituting the respective first and second applications through the first and second GPUs among the plurality of GPUs. If the operation on the respective video data constituting the first and second applications is performed through the first and second GPUs, the graphics processing apparatus performs rendering of the respective video data constituting the first and second applications based on the result of the operation on the respective video data, which is operated on by the first and second GPUs, through the third and fourth GPUs.

That is, the graphics processing apparatus performs rendering of the respective video data constituting the first application based on the result of the operation on the respective video data constituting the first application, which is operated on by the first GPU, through the third GPU. Further, the graphics processing apparatus performs rendering of the respective video data constituting the second application based on the result of the operation on the respective video data constituting the second application, which is operated on by the second GPU, through the fourth GPU.

As described above, if the rendering of the respective video data constituting the first and second applications is performed through respective third and fourth GPUs, the graphics processing apparatus may perform the blending of the respective video data constituting the first and second applications that are pre-rendered through the 2D accelerator and display a plurality of blended application images.

Up to now, the present disclosure has been described around the exemplary embodiments thereof.

While the present disclosure has been shown and described with reference to certain exemplary embodiments thereof, it will be understood by those skilled in the art that various changes in form and detail may be made therein without departing from the spirit and scope of the present disclosure, as defined by the appended claims.

What is claimed is:

1. A graphics processing method for processing applications based on a plurality of Graphics Processing Units (GPUs), the method comprising:
    rendering a plurality of graphics data constituting an application executed in an electronic device, by using a subset of the plurality of GPUs respectively;
    blending the plurality of graphics data that are rendered; and
    outputting blended images,
    wherein, when the blending is performed by at least one GPU, the at least one GPU is different from the subset of the plurality of GPUs, and
    wherein the rendering is performed by the subset of the plurality of GPUs except the at least one GPU.

2. The graphics processing method as claimed in claim 1, wherein the blending is performed by a video processing constituent element comprising at least one of a two-dimensional (2D) accelerator and a video controller, and
    wherein, when the blending is performed by the 2D accelerator which is different from the plurality of GPUs, the outputting comprises outputting the blended images by the video controller.

3. The graphics processing method as claimed in claim 1, further comprising scheduling the rendering of the plurality of graphics data constituting the application with respect to the plurality of GPUs,
    wherein the rendering renders the plurality of graphics data based on operations of the plurality of GPUs according to the scheduling.

4. The graphics processing method as claimed in claim 3, wherein the scheduling additionally schedules the rendering of the plurality of graphics data with respect to at least one another GPU which is in an idle state based on a state of a rendering operation that is pre-performed in the plurality of GPUs.

5. The graphics processing method as claimed in claim 3, wherein the plurality of GPUs include at least a first GPU and a second GPU, and the rendering renders a first graphics data among the plurality of graphics data through the first GPU in accordance with the scheduling of the rendering operation of the plurality of graphics data constituting a single application, and renders a second graphics data among the plurality of graphics data through the second GPU.

6. The graphics processing method as claimed in claim 3, wherein the plurality of GPUs include at least a first GPU, a second GPU, a third GPU and a fourth GPU, and the rendering renders first and second graphics data constituting a first application through the first and the second GPUs in accordance with scheduling of rendering of a plurality of applications, and renders the first and second graphics data constituting a second application through the third and the fourth GPUs.

7. The graphics processing method as claimed in claim 3, wherein the plurality of GPUs include at least a first GPU, a second GPU, a third GPU and a fourth GPU, and the rendering performs an operation on first and second graphics data constituting a single application through the first and the second GPUs among the plurality of GPUs in accordance with the scheduling of the rendering of the plurality of graphics data constituting the single application, and renders the first and second graphics data based on a result of the operation through the third and the fourth GPUs among the plurality of GPUs.

8. The graphics processing method as claimed in claim 3, wherein the plurality of GPUs include at least a first GPU, a second GPU, a third GPU and a fourth GPU, and the rendering performs an operation on respective graphics data constituting first and second applications through the first and the second GPUs among the plurality of GPUs in accordance with scheduling of rendering of a plurality of applications, and renders the respective graphics data constituting the first and second applications based on a result of the operation through the third and the fourth GPUs among the plurality of GPUs.

9. A graphics processing apparatus comprising:
    a display;
    a plurality of Graphics Processing Units (GPUs) configured to render a plurality of graphics data constituting an application executed in an electronic device; and
    a controller configured to blend the plurality of graphics data that are rendered by the plurality of GPUs, and to display blended graphics data through the display,
    wherein, when the controller operates to perform blending through at least one GPU, the at least one GPU is different from the plurality of GPUs, and
    wherein rendering of the plurality of graphics data is performed by the plurality of GPUs except the at least one GPU.

10. The graphics processing apparatus as claimed in claim 9, wherein the blending is performed by a video processing constituent element comprising at least one of a two-dimensional (2D) accelerator and a video controller, and
    wherein, when the blending is performed by the 2D accelerator which is different from the plurality of GPUs, blended images are output by the video controller.

11. The graphics processing apparatus as claimed in claim 9, further comprising a storage,
    wherein the controller schedules a rendering operation of the plurality of graphics data constituting the application with respect to the plurality of GPUs to store scheduling of the rendering operation, and
    the plurality of GPUs render the plurality of graphics data according to the scheduling pre-stored in the storage.

12. The graphics processing apparatus as claimed in claim 11, wherein the controller additionally schedules the rendering operation of the plurality of graphics data with respect to at least one another GPU that is in an idle state based on a state of the rendering operation that is pre-performed in the plurality of GPUs.

13. The graphics processing apparatus as claimed in claim 11, wherein the plurality of GPUs comprise:
    a first GPU configured to render a first graphics data among the plurality of graphics data in accordance with the scheduling of the rendering operation of the plurality of graphics data constituting a single application; and
    a second GPU configured to render a second graphics data among the plurality of graphics data.

14. The graphics processing apparatus as claimed in claim 11, wherein the plurality of GPUs comprise:
    a first GPU configured to render a first graphics data constituting a first application according to scheduling of the rendering operation of a plurality of applications;
    a second GPU configured to render a second graphics data constituting the first application;

a third GPU configured to render the first graphics data constituting a second application; and a fourth GPU configured to render the second graphics data constituting the second application.

15. The graphics processing apparatus as claimed in claim 11, wherein the plurality of GPUs comprise:
- a first GPU configured to perform an operation of a first graphics data among the plurality of graphics data according to the scheduling of the rendering operation of the plurality of graphics data constituting a single application;
- a second GPU configured to perform an operation of a second graphics data;
- a third GPU configured to render the first graphics data based on a result of the operation on the first GPU; and
- a fourth GPU configured to render the second graphics data based on a result of the operation on the second GPU.

16. The graphics processing apparatus as claimed in claim 11, wherein the plurality of GPUs comprise:
- a first GPU configured to perform an operation of respective graphics data constituting a first application according to scheduling of the rendering operation of a plurality of applications;
- a second GPU configured to perform an operation of respective graphics data constituting a second application;
- a third GPU configured to render the respective graphics data constituting the first application based on a result of the operation on the first GPU; and
- a fourth GPU configured to render the respective graphics data constituting the second application based on a result of the operation on the second GPU.

* * * * *